(12) United States Patent
Nakayama et al.

(10) Patent No.: US 11,247,436 B2
(45) Date of Patent: Feb. 15, 2022

(54) LAMINATED GLASS INTERMEDIATE FILM AND LAMINATED GLASS

(71) Applicant: SEKISUI CHEMICAL CO., LTD., Osaka (JP)

(72) Inventors: Kazuhiko Nakayama, Shiga (JP); Yuusuke Oota, Shiga (JP); Hirofumi Kitano, Shiga (JP); Hiroaki Inui, Roermond (NL)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/324,028

(22) PCT Filed: Sep. 30, 2015

(86) PCT No.: PCT/JP2015/077858
§ 371 (c)(1),
(2) Date: Jan. 5, 2017

(87) PCT Pub. No.: WO2016/052668
PCT Pub. Date: Apr. 7, 2016

(65) Prior Publication Data
US 2017/0203536 A1    Jul. 20, 2017

(30) Foreign Application Priority Data

Sep. 30, 2014  (JP) .............................. JP2014-202340

(51) Int. Cl.
*B32B 17/10*    (2006.01)
*B32B 3/30*     (2006.01)
*B32B 7/02*     (2019.01)

(52) U.S. Cl.
CPC .......... *B32B 17/10036* (2013.01); *B32B 3/30* (2013.01); *B32B 7/02* (2013.01);
(Continued)

(58) Field of Classification Search
CPC .. B32B 3/26; B32B 3/263; B32B 3/30; B32B 17/06; B32B 17/064; B32B 17/10;
(Continued)

(56) References Cited

U.S. PATENT DOCUMENTS 3,507,943 A * 4/1970 Such ...................... D04H 1/541
428/198
5,455,103 A   10/1995 Hoagland et al.
(Continued)

FOREIGN PATENT DOCUMENTS

| BY | 8073 | 6/2006 |
|----|------|--------|
| CA | 2 388 107 | 5/2001 |

(Continued)

OTHER PUBLICATIONS

Machine Translation of JP 09-295839 Nakajima et al (1997). Obtained from JPO on Aug. 3, 2018.*
(Continued)

*Primary Examiner* — Megha M Gaitonde
(74) *Attorney, Agent, or Firm* — Wenderoth, Lind & Ponack, L.L.P.

(57) ABSTRACT

The present invention aims to provide an interlayer film for a laminated glass which can be stored in a stacked state without experiencing autohesion so as to be easily peelable, and a laminated glass including the interlayer film for a laminated glass. The present invention relates to an interlayer film for a laminated glass, having a large number of recesses and a large number of projections on a first surface and a second surface opposite to the first surface, the recesses on the first surface and the second surface each having a groove shape with a continuous bottom and being regularly adjacent and parallel to each other, the interlayer film for a laminated glass satisfying Formulae (1) and (2):

$$\theta \geq 10° \quad (1),$$

$$R/Sm \leq 0.3 \quad (2),$$

(Continued)

the θ representing an intersection angle of the recesses each having a groove shape with a continuous bottom on the first surface and the recesses each having a groove shape with a continuous bottom on the second surface, the Sm representing the average of Sm1 (μm) and Sm2 (μm), the Sm1 representing an interval between the recesses each having a groove shape with a continuous bottom on the first surface, the Sm2 representing an interval between the recesses each having a groove shape with a continuous bottom on the second surface, the R representing the average of R1 (μm) and R2 (μm), the R1 representing the radius of rotation of the projections on the first surface, the R2 representing the radius of rotation of the projections on the second surface.

11 Claims, 2 Drawing Sheets

(52) U.S. Cl.
CPC .. *B32B 17/10587* (2013.01); *B32B 17/10761* (2013.01); *B32B 2307/538* (2013.01)

(58) Field of Classification Search
CPC .......... B32B 17/10165; B32B 17/1055; B32B 17/10559; B32B 17/10761; B32B 17/10568; B32B 17/10577; B32B 17/10587; B32B 27/06; B32B 27/30; B32B 27/306; Y10T 428/24058; Y10T 428/24355; Y10T 428/24364; Y10T 428/24405; Y10T 428/24479; Y10T 428/24504; Y10T 428/24521; Y10T 428/24529; Y10T 428/24537; Y10T 428/2457; Y10T 428/24612; Y10T 428/2462; Y10T 428/24942; Y10T 428/2495; Y10T 428/24959
USPC ....... 428/105, 112, 141, 142, 147, 156, 159, 428/161, 162, 163, 167, 172, 173, 212, 428/213, 214
See application file for complete search history.

(56) References Cited

U.S. PATENT DOCUMENTS

| | | | |
|---|---|---|---|
| 6,093,471 A | 7/2000 | Hopfe et al. | |
| 7,678,441 B2 | 3/2010 | Smith | |
| 2004/0191482 A1* | 9/2004 | Nakajima | B29C 59/022 |
| | | | 428/156 |
| 2015/0174862 A1 | 6/2015 | Kitano et al. | |
| 2016/0101602 A1 | 4/2016 | Kitano et al. | |

FOREIGN PATENT DOCUMENTS

| | | |
|---|---|---|
| CN | 105358503 | 2/2016 |
| EP | 3 202 729 | 8/2017 |
| EP | 3 205 632 | 8/2017 |
| EP | 3 281 926 | 2/2018 |
| JP | 60-208241 | 10/1985 |
| JP | 8-26789 | 1/1996 |
| JP | 9-295839 | 11/1997 |
| JP | 2001-130931 | 5/2001 |
| JP | 2001-261385 | 9/2001 |
| JP | 2002-102846 | 4/2002 |
| JP | 2002-104846 | 4/2002 |
| JP | 2003-128442 | 5/2003 |
| JP | 2003-212614 | 7/2003 |
| WO | 2014/021459 | 2/2014 |

OTHER PUBLICATIONS

Extended European Search Report dated May 25, 2018 in European Application No. 15847828.9.
International Search Report dated Dec. 22, 2015 in International (PCT) Application No. PCT/JP2015/077858.
"Interchangeability and Technical Measurement", China Quality Inspection Press, Jun. 2012, Textbook for colleges and universities, 6th Edition, Nianzhao LIAO, ed., pp. 117-119, with English language Concise Explanation.
Search Report dated Apr. 21, 2021 in European Application No. 15 847 828.9.

* cited by examiner (a)

(b)

LAMINATED GLASS INTERMEDIATE FILM AND LAMINATED GLASS

TECHNICAL FIELD

The present invention relates to an interlayer film for a laminated glass which can be stored in a stacked state without experiencing autohesion so as to be easily peelable, and a laminated glass including the interlayer film for a laminated glass.

BACKGROUND ART

A laminated glass including two glass plates integrated through an interlayer film for a laminated glass containing plasticized polyvinyl butyral is widely used particularly for vehicular windshields.

In an exemplary method for producing a laminated glass, a roll of an interlayer film for a laminated glass is rewound and cut at an appropriate size, and the resulting interlayer film for a laminated glass is sandwiched between at least two glass plates. The resulting laminate is placed in a rubber bag and vacuum suctioned for removal of air remaining between the glass plates and the interlayer film so as to be preliminarily pressure bonded. Then, the laminate is pressurized with heat, for example, in an autoclave for final pressure bonding (see, for example, Patent Literature 1).

In such a method for producing a laminated glass, an interlayer film for a laminated glass is cut to a predetermined size in advance and stored in a stacked state in a constant temperature and humidity room for better production efficiency. However, the stacked interlayer films for a laminated glass may adhere to each other (autohesion) during the storage, and the adhered films cannot be peeled by humans or a device for carrying the interlayer film for a laminated glass.

CITATION LIST

Patent Literature

Patent Literature 1: JP H08-26789 A

SUMMARY OF INVENTION

Technical Problem

The present invention aims to, in consideration of the state of the art, provide an interlayer film for a laminated glass which can be stored in a stacked state without experiencing autohesion so as to be easily peelable, and a laminated glass including the interlayer film for a laminated glass.

Solution to Problem

The present invention provides an interlayer film for a laminated glass, having a large number of recesses and a large number of projections on a first surface and a second surface opposite to the first surface, the recesses on the first surface and the second surface each having a groove shape with a continuous bottom and being regularly adjacent and parallel to each other, the interlayer film for a laminated glass satisfying Formulae (1) and (2):

$$\theta \geq 10°  \quad (1),$$

$$R/Sm \leq 0.3 \quad (2),$$

the $\theta$ representing an intersection angle of the recesses each having a groove shape with a continuous bottom on the first surface and the recesses each having a groove shape with a continuous bottom on the second surface, the Sm representing the average of Sm1 (μm) and Sm2 (μm), the Sm1 representing an interval between the recesses each having a groove shape with a continuous bottom on the first surface, the Sm2 representing an interval between the recesses each having a groove shape with a continuous bottom on the second surface, the R representing the average of R1 (μm) and R2 (μm), the R1 representing the radius of rotation of the projections on the first surface, the R2 representing the radius of rotation of the projections on the second surface.

The present invention is specifically described in the following.

In the process for producing a laminated glass, deaeration properties upon stacking a glass plate and an interlayer film for a laminated glass on top of each other is important. The interlayer film for a laminated glass therefore has minute projections and recesses formed on at least one surface for the purpose of ensuring the deaeration properties in production of a laminated glass. In particular, when recesses, among the projections and recesses, each have a groove shape with a continuous bottom (hereafter, also referred to as a "shape of an engraved line") and such recesses in the shape of engraved lines are regularly formed adjacent and parallel to each other, excellent deaeration properties can be exhibited.

The present inventors studied intensively to find out that the adhesion force (autohesion force) between interlayer films for a laminated glass stored in a stacked state is significantly affected by the pattern of projections and recesses on the interlayer films for a laminated glass. As a result of further intensive studies, the present inventors found out that when the pattern of projections and recesses on both surfaces of an interlayer film for a laminated glass is controlled to satisfy Formulae (1) and (2), the autohesion during the storage in a stacked state can be prevented, facilitating peeling thereof. The present invention was thus completed.

The interlayer film for a laminated glass of the present invention has a large number of recesses and a large number of projections on a first surface and a second surface opposite to the first surface. With this structure, deaeration properties during production of a laminated glass can be ensured.

The pattern of the projections and recesses may be a common pattern of projections and recesses imparted on a surface of an interlayer film for a laminated glass, such as a pattern of engraved lines or grids, as long as it is a pattern of grooves. The pattern of projections and recesses may be a pattern transferred from an embossing roll.

The projections may each have a planar apex as illustrated in FIG. 1 or a non-planar apex as illustrated in FIG. 2. In cases where the projections each have a planar apex, finer projections and recesses may be further formed on the planar apex.

Moreover, the projections, among the projections and recesses, may have the same height or different heights. The recesses corresponding to these projections may have the same depth or different depths as long as the recesses each have a continuous bottom.

In the interlayer film for a laminated glass of the present invention, the recesses on the first surface and the second surface each have a groove shape with a continuous bottom and are regularly adjacent and parallel to each other. Commonly, ease of deaeration upon pressure bonding of a laminate including an interlayer film for a laminated glass interposed between two glass plates closely relates to the communication properties and smoothness of the bottoms of the recesses. When the pattern of the projections and recesses on both surfaces of the interlayer film is a pattern in which recesses each having a groove shape with a continuous bottom are regularly adjacent and parallel to each other, the communication properties of the recesses are further improved to markedly increase the deaeration properties.

In the state "regularly adjacent and parallel to each other", the adjacent recesses each having a groove shape may be regularly adjacent and parallel to each other at equal intervals. Alternatively, the adjacent recesses in the shape of engraved lines may be regularly adjacent and parallel to each other not necessarily at equal intervals between all the adjacent recesses.

FIGS. 1 and 2 each are a view schematically illustrating an exemplary interlayer film for a laminated glass in which recesses each having a groove shape are regularly adjacent and parallel to each other at equal intervals.

FIG. 3 is a view schematically illustrating an exemplary interlayer film for a laminated glass in which recesses each having a groove shape are regularly adjacent and parallel to each other not at equal intervals. In FIG. 3, an interval A between a recess 1 and a recess 2 and an interval B between the recess 1 and a recess 3 are different.

In the interlayer film for a laminated glass of the present invention, θ, Sm, and R are defined to satisfy specific conditions. The θ represents an intersection angle of the recesses each having a groove shape with a continuous bottom on the first surface and the recesses each having a groove shape with a continuous bottom on the second surface. The Sm is the average of Sm1 representing an interval between the recesses each having a groove shape with a continuous bottom on the first surface and Sm2 representing an interval between the recesses each having a groove shape with a continuous bottom on the second surface. The R is the average of R1 representing the radius of rotation R of the projections on the first surface and R2 representing the radius of rotation of the projections on the second surface.

FIG. 4 is a view schematically explaining the intersection angle θ. In FIG. 4, an interlayer film for a laminated glass 10 has recesses 11 each having a groove shape with a continuous bottom, indicated by solid lines, on the first surface and recesses 12 each having a groove shape with a continuous bottom, indicated by dotted lines, on the second surface. The intersection angle θ indicates an intersection angle between the recess having a groove shape with a continuous bottom indicated by the solid line and the recess having a groove shape with a continuous bottom indicated by the dotted line.

The intersection angle θ is measured by, for example, observing the interlayer film for a laminated glass visually or with an optical microscope. In the case of visual observation, straight lines are drawn, in ink on the both surfaces, parallel to the recesses each having a groove shape with a continuous bottom on the first surface and the recesses each having a groove shape with a continuous bottom on the second surface, and the acute angle formed between the straight lines is measured with a protractor. In the case of observation with an optical microscope, a magnified surface is photographed and the acute angle is measured using image processing software.

FIG. 5 is a view schematically explaining the interval Sm between the recesses and the radius of rotation R of the projections. In FIG. 5(a), projections and recesses 20 on the first surface or second surface include recesses 21 each having a groove shape with a continuous bottom and projections 22. The interval Sm refers to an interval between the recesses 21. In FIG. 5(b), the radius of rotation R of the projections refers to the radius of an inscribed circle at the apex of the projection 22.

The interval Sm of the recesses can be measured by the following method. Specifically, the surface (observation range: 20 mm×20 mm) of the interlayer film for a laminated glass is observed with an optical microscope (e.g., BS-8000III produced by SONIC) for measuring all the shortest distances between the adjacent recesses at the deepest bottoms. Next, the average of the measured shortest distances is calculated as the interval of the recesses. Alternatively, the maximum among the measured shortest distances may be taken as the interval of the recesses. The interval of the recesses may be the average or the maximum of the shortest distances, and is preferably the average of the shortest distances. The measurement is performed at 23° C. and 30 RH %. According to the above procedure, the interval Sm1 between the recesses each having a groove shape with a continuous bottom on the first surface, the interval Sm2 between the recesses each having a groove shape with a continuous bottom on the second surface, and the average Sm of Sm1 and Sm2 are measured.

The radius of rotation R of the projections is measured as follows, for example. The interlayer film is cut with a single-edged razor (e.g., FAS-10 produced by FEATHER Safety Razor Co., Ltd.) in a direction perpendicular to the direction of the engraved lines of the recesses and parallel to the thickness direction of the film in such a manner that the cut plane is not deformed. Specifically, the razor is not slid in the direction perpendicular to the recesses but pressed in the direction parallel to the thickness direction. The cross section is observed using a microscope (e.g., "DSX-100" produced by Olympus Corporation) and photographed at a magnification of 277 times. The obtained image is enlarged to 50 μm/20 mm for analysis using measurement software included in accessory software. The radius of an inscribed circle at the apex of a projected portion is determined as the radius of rotation of the projections. The measurement is performed at 23° C. and 30 RH %. According to the above procedure, the radius of rotation R1 of the projections on the first surface, the radius of rotation R2 of the projections on the second surface, and the average R of R1 and R2 are measured.

The roughness Rz of tip portions of the projections is defined in accordance with the ten-point average roughness of JIS B 0601 (1994), and can be measured, for example, by processing digital signals measured with a three-dimensional profilometer (e.g., "KS-1100" produced by KEYENCE CORPORATION). The roughness of tip portions of the projections can be measured as follows. Specifically, the surface roughness of the interlayer film for a laminated glass is measured in a visual field of 2 cm×2 cm using a three-dimensional profilometer (e.g., "KS-1100" produced by KEYENCE CORPORATION, head: model "LT-9510VM") and "KS-measure", measurement software included therewith. In the obtained data, the roughness over a length of 2.5 mm along the direction parallel to the direction in which the apex portions of the projections are continuous is measured at 10 sites on the apex portions of the projections. The average of the 10 obtained values is taken as the roughness of the tip portions of the projections. When 10 sites of the roughness of a length of 2.5 mm are determined, the lines of 2.5 mm length are preferably apart from each other by 50 μm or more. Here, the roughness refers to "Rz" which is determined as follows. "KS-Analyzer Ver. 2.00", analysis software included with the profilometer, is used in the line roughness measurement mode with a length condition set at "2500 μm". The area of interest is selected in the obtained three-dimensional image data, and roughness profile data of the area is obtained. The Rz is determined based on the obtained roughness profile data. The roughness profile data is obtained at a cut-off value of 2.5 mm. Height smoothing and tilt correction are not performed. The measurement conditions other than the visual field are as follows: stage feed condition: continuous; scan direction: bi-directional scanning; leading axis: X-axis; stage travel rate: 250.0 μm/s; and axis feed rate: 10000.0 μm/s. The measuring pitch of the X-axis is set at 2.0 μm, and that of the Y-axis is set at 2.0 μm. When the interval between the recesses in the shape of engraved lines is so large that the measurement distance is insufficient, a visual field adjacent to the measured visual field may be measured in the same manner to increase the number of measurement sites. In a case where the highest point of the projection is positioned at the center point of a shortest straight line connecting the deepest bottoms of two adjacent recesses, present in the visual field of 2 cm×2 cm, the "apex portion" of the projection in the measurement of the roughness of the tip portions refers to a range corresponding to 10% of the length of the shortest straight line, centered on the center point of the shortest straight line connecting the deepest bottoms of two adjacent recesses. In a case where the highest point of the projection is not positioned at the center point of the shortest straight line connecting the deepest bottoms of two adjacent recesses, the "apex portion" of the projection refers to a range corresponding to 10% of the length of the shortest straight line, centered on the point at which the projection is highest on the shortest straight line connecting the deepest bottoms of two adjacent recesses.

The measurement is performed at 23° C. and 30 RH %.

In accordance with the above procedure, the roughness $Rz_1$ of the tip portions of the projections on the first surface, the roughness $Rz_2$ of the tip portions of the projections on the second surface, and the average Rz of $Rz_1$ and $Rz_2$ are measured.

In the interlayer film for a laminated glass of the present invention, the intersection angle θ, the average Sm of the $Sm_1$ and the $Sm_2$, and the average R of the $R_1$ and $R_2$ satisfy Formulae (1) and (2). With this structure, the interlayer film for a laminated glass can be stored without experiencing autohesion even in a stacked state so as to be easily peelable. Here, in an interlayer film embossed in a pattern of engraved lines, autohesion occurs at a point where the tip portions of the projections in the shape of engraved lines are in contact with one another. When the R/Sm is smaller, the contact area between the stacked films per unit area becomes smaller, thereby presumably preventing autohesion. For further avoiding autohesion during storage of the interlayer film for a laminated glass in a stacked state to facilitate peeling thereof, the $Sm_1$ or $Sm_2$, instead of the average Sm of the $Sm_1$ and the $Sm_2$, and the $R_1$ or $R_2$, instead of the average R of the $R_1$ and the $R_2$, preferably satisfy Formulae (1) and (2).

Formulae (1) and (2) are preferably satisfied in both a case where the $Sm_1$, instead of the average Sm of the $Sm_1$ and the $Sm_2$, and the $R_1$, instead of the R as the average of the $R_1$ and the $R_2$, are used and a case where the $Sm_2$, instead of the average Sm of the $Sm_1$ and the $Sm_2$, and the $R_2$, instead of the average R of the $R_1$ and the $R_2$, are used. The R/Sm is preferably less than 0.3, more preferably 0.2 or less, still more preferably 0.11 or less.

According to the interlayer film for a laminated glass of the present invention, the average Rz (μm) of the $Rz_1$ and the $Rz_2$ preferably satisfies Formula (3). When the roughness Rz of the tip portions of the projections is set to be a predetermined value or more, the contact area at a point where the tip portions of the projections are in contact with one another can be reduced. As a result, autohesion during the storage of the interlayer film for a laminated glass in a stacked state can be further avoided, and peeling of the film is further facilitated. In addition, favorable deaeration properties can be achieved. For still further avoiding autohesion during the storage of the interlayer film for a laminated glass in a stacked state to facilitate peeling thereof, the $Rz_1$ or $Rz_2$, instead of the average Rz of the $Rz_1$ and the $Rz_2$, preferably satisfy Formula (3). Formula (3) is more preferably satisfied in both a case where the $Rz_1$ is used and a case where the $Rz_2$ is used, instead of the Rz as the average of the $Rz_1$ and the $Rz_2$.

The $Rz_1$, the $Rz_2$, and the average Rz of the $Rz_1$ and the $Rz_2$ are each more preferably more than 1, still more preferably 5 or more, particularly preferably 10 or more. The roughness Rz of the tip portions of the projections is preferably 30 or less, more preferably 20 or less.

$$Rz \geq 1 \quad (3),$$

When the average Sm of the $Sm_1$ and the $Sm_2$ is smaller and the intersection angle θ is closer to 90°, the number of contact points between the films can be increased without increasing the contact area per unit area. In such a case, the load per contact point is reduced, thereby presumably suppressing autohesion. The interlayer film for a laminated glass of the present invention preferably satisfies Formula (4). Satisfaction of Formula (4) can further lower the autohesion force, facilitating peeling. For still further avoiding autohesion during storage of the interlayer film for a laminated glass in a stacked state to facilitate peeling thereof, more preferably, the $Sm_1$ or $Sm_2$, instead of the average Sm of the $Sm_1$ and the $Sm_2$, satisfies Formula (4).

Formula (4) substantially indicates the density of the contact points per unit area. The number of contact points per unit area corresponds to the number of the intersections of the projections on the contacting surfaces, and therefore is the product of the number of the projections on the contacting surfaces. In a tentative determination of the number of contact points between the projections of the interlayer film per $mm^2$, the number of projections on one surface per $mm^2$ is represented by (1000/Sm) and the number of projections on the other surface per $mm^2$ depends on the intersection angle, and therefore, the number of contact points correlates with (1000/Sm)×Sin θ. From the above, Formula (4) is drawn.

The right side of Formula (4) is more preferably more than 2.2, still more preferably 5 or more, particularly preferably 9 or more, still particularly preferably 20 or more.

$$(1000/Sm)^2 \times \sin \theta \geq 2.2 \quad (4).$$

From the viewpoint of further reducing the autohesion force to facilitate peeling, the intersection angle θ is preferably 20° or larger, more preferably 45° or larger, most preferably 90°. From the viewpoint of effectively prevent misalignment of the glass plate and the interlayer film for a laminated glass on a conveyor in production of a laminated glass, the intersection angle is preferably smaller than 90°, more preferably 85° or smaller, still more preferably 75° or smaller.

The $Sm_1$, the $Sm_2$, and the average Sm of the $Sm_1$ and the $Sm_2$ are each preferably 400 μm or less, more preferably 200 µm or less, still more preferably 100 µm or less. The R1, the R2, and the average R of the R1 and the R2 are each preferably 100 µm or less, more preferably 40 µm or less, still more preferably 25 µm or less.

From the viewpoint of improving the deaeration properties of the interlayer film for a laminated glass of the present invention, at least one surface has a roughness Rz of preferably 10 to 60 µm, more preferably 20 to 55 µm, still more preferably 30 to 50 µm.

The roughness Rz of the surface is defined in JIS B-0601 (2001), and can be obtained by measurement in a perpendicular direction so as to transverse the direction in which the recesses in the direction of engraved lines are continuous. The measurement device may be, for example, "Surfcorder SE300" produced by Kosaka Laboratory Ltd. The measurement may be performed at a cut-off value of 2.5 mm, a standard length of 2.5 mm, a measurement length of 12.5 mm, a spare length of 2.5 mm, and a stylus feed rate of 0.5 mm/sec, with a stylus having a tip radius of 2 µm and a tip angle of 60°. The measurement is performed at 23° C. and 30 RH %. The interlayer film is allowed to stand in an environment of the measurement conditions for three hours or longer before the measurement.

Examples of a method for forming a large number of recesses and a large number of projections on the first surface and the second surface of the interlayer film for a laminated glass of the present invention include an embossing roll method, a calender roll method, a profile extrusion method, and an extrusion lip embossing method which takes advantage of melt fracture. In particular, preferred is the embossing roll method because the structure where the recesses each having a groove shape are formed parallel to each other and arranged adjacent to each other is easily achieved.

Exemplary embossing rolls used in the embossing roll method include an embossing roll having an emboss pattern (pattern of projections and recesses) on the roll surface which is prepared by blasting a metal roll with an abrasive material such as aluminum oxide or silicon oxide and lapping the surface through vertical grinding for the purpose of reducing excessive peaks. Other examples include an embossing roll having an emboss pattern (pattern of projections and recesses) on the roll surface which is prepared by transferring the emboss pattern (pattern of projections and recesses) to a metal roll surface with an engraving mill. Other examples further include an embossing roll having an emboss pattern (pattern of projections and recesses) formed by etching on the roll surface.

The interlayer film for a laminated glass of the present invention may have a single layer structure consisting of one resin film or a multilayer structure including two or more resin layers laminated together.

In the case of having a multilayer structure, the interlayer film for a laminated glass of the present invention may include, as two or more resin layers mentioned above, a first resin layer and a second resin layer having different characteristics. Such an interlayer film for a laminated glass can have various properties which are hardly achieved by a single layer structure.

The resin layer preferably contains a thermoplastic resin. Examples of the thermoplastic resin include polyvinylidene fluoride, polytetrafluoroethylene, vinylidene fluoride-propylene hexafluoride copolymers, polyethylene trifluoride, acrylonitrile-butadiene-styrene copolymers, polyester, polyether, polyamide, polycarbonate, polyacrylate, polymethacrylate, polyvinyl chloride, polyethylene, polypropylene, polystyrene, polyvinyl acetal, and ethylene-vinyl acetate copolymers. In particular, the resin layer contains preferably polyvinyl acetal or an ethylene-vinyl acetate copolymer, more preferably polyvinyl acetal.

The polyvinyl acetal can be prepared, for example, by acetalization of polyvinyl alcohol (PVA) with an aldehyde. The polyvinyl acetal is preferably an acetalization product of polyvinyl alcohol. The PVA commonly has a degree of saponification within a range of 70 to 99.9 mol %.

The polyvinyl alcohol (PVA) to be used for preparing the polyvinyl acetal has a degree of polymerization of preferably 200 or more, more preferably 500 or more, still more preferably 1700 or more, particularly preferably 2000 or more, and preferably 5000 or less, more preferably 4000 or less, still more preferably 3000 or less, furthermore preferably less than 3000, particularly preferably 2800 or less. The polyvinyl acetal is preferably a polyvinyl acetal prepared by acetalization of PVA having a degree of polymerization that satisfies the above lower limit and upper limit. When the degree of polymerization is equal to or more than the lower limit, a laminated glass to be obtained has higher penetration resistance. When the degree of polymerization is equal to or lower than the upper limit, formation of an interlayer film is facilitated.

The degree of polymerization of PVA refers to the average degree of polymerization. The average degree of polymerization can be obtained by the method in conformity with JIS K6726 "Testing methods for polyvinyl alcohol". Commonly, the aldehyde is preferably a C1-C10 aldehyde. Examples of the C1-C10 aldehyde include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, and benzaldehyde. Preferred among these are n-butyraldehyde, n-hexylaldehyde, and n-valeraldehyde, and more preferred is n-butyraldehyde. These aldehydes may be used alone or in combination of two or more thereof.

The polyvinyl acetal contained in the interlayer film is preferably polyvinyl butyral resin. The use of polyvinyl butyral resin further increases the weather resistance or like properties of the interlayer film relative to a laminated glass member.

The resin layer preferably contains polyvinyl acetal and a plasticizer.

Any plasticizer may be used as long as it is commonly used in interlayer films for a laminated glass. Examples thereof include organic plasticizers such as monobasic organic acid esters and polybasic organic acid esters, and phosphoric acid plasticizers such as organophosphate compounds and organophosphite compounds.

Examples of the organic plasticizers include triethylene glycol-di-2-ethylhexanoate, triethylene glycol-di-2-ethylbutyrate, triethylene glycol-di-n-heptanoate, tetraethylene glycol-di-2-ethylhexanoate, tetraethylene glycol-di-2-ethylbutyrate, tetraethylene glycol-di-n-heptanoate, diethylene glycol-di-2-ethylhexanoate, diethylene glycol-di-2-ethylbutyrate, and diethylene glycol-di-n-heptanoate. Among these, the resin layer contains preferably triethylene glycol-di-2-ethylhexanoate, triethylene glycol-di-2-ethylbutyrate, or triethylene glycol-di-n-heptanoate, more preferably triethylene glycol-di-2-ethylhexanoate.

The resin layer preferably contains an adhesion modifier. In particular, the resin layer to be in contact with a glass plate in production of a laminated glass preferably contains an adhesion modifier.

As the adhesion modifier, for example, an alkali metal salt or an alkaline earth metal salt is preferably used. Examples of the adhesion modifier include salts such as potassium, sodium, and magnesium salts.

Examples of an acid forming the salts include organic carboxylic acids such as octylic acid, hexylic acid, 2-ethylbutyric acid, butyric acid, acetic acid, and formic acid, and inorganic acids such as hydrochloric acid and nitric acid. The resin layer to be in contact with the glass plate preferably contains magnesium salt as an adhesion modifier because the adhesion force between the glass plate and the resin layer can be easily adjusted in production of a laminated glass.

The resin layer may optionally contain additives such as an antioxidant, a light stabilizer, a modified silicone oil as an adhesion modifier, a flame retardant, an antistatic agent, a damp proofing agent, a heat ray reflecting agent, and a heat ray absorbing agent.

Preferably, the interlayer film for a laminated glass of the present invention includes, as two or more resin layers mentioned above, at least a first resin layer and a second resin layer, and polyvinyl acetal contained in the first resin layer (hereafter, referred to as polyvinyl acetal A) has a hydroxy group content different from that of polyvinyl acetal contained in the second resin layer (hereafter, referred to as polyvinyl acetal B).

Due to different characteristics of the polyvinyl acetal A and the polyvinyl acetal B, an interlayer film for a laminated glass to be provided can have various properties which are hardly achieved by a single layer structure. For example, in a case where the first resin layer is interposed between two second resin layers and the polyvinyl acetal A has a lower hydroxy group content than the polyvinyl acetal B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the polyvinyl acetal A has a higher hydroxy group content than the polyvinyl acetal B, the first resin layer tends to have a higher glass transition temperature than the second resin layer. As a result, the first resin layer is harder than the second resin layer, leading to higher penetration resistance of the interlayer film for a laminated glass.

In the case where the first resin layer and the second resin layer each contain a plasticizer, the plasticizer content (hereafter, referred to as content A) of the first resin layer based on 100 parts by mass of the polyvinyl acetal is preferably different from the plasticizer content (hereafter, referred to as content B) of the second resin layer based on 100 parts by mass of the polyvinyl acetal. For example, in a case where the first resin layer is interposed between two second resin layers and the content A is greater than the content B, the first resin layer tends to have a lower glass transition temperature than the second resin layer. As a result, the first resin layer is softer than the second resin layer, leading to higher sound insulation properties of the interlayer film for a laminated glass. In a case where the first resin layer is interposed between two second resin layers and the content A is smaller than the content B, the first resin layer tends to have a higher glass transition temperature than the second resin layer. As a result, the first resin layer is harder than the second resin layer, leading to higher penetration resistance of the interlayer film for a laminated glass.

The combination of two or more resin layers included in the interlayer film for a laminated glass of the present invention may be, for example, a sound insulation layer as the first resin layer and a protective layer as the second resin layer with an aim of improving the sound insulation properties of a laminated glass to be obtained. For higher sound insulation properties of a laminated glass to be obtained, preferably, the sound insulation layer contains the polyvinyl acetal X and a plasticizer, and the protective layer contains the polyvinyl acetal Y and a plasticizer. Moreover, in a case where the sound insulation layer is interposed between two protective layers, the resulting interlayer film for a laminated glass (hereafter, also referred to as a sound insulation interlayer film) can have excellent sound insulation properties. The sound insulation interlayer film is more specifically described in the following.

In the sound insulation interlayer film, the sound insulation layer imparts sound insulation properties. The sound insulation layer preferably contains the polyvinyl acetal X and a plasticizer.

The polyvinyl acetal X can be prepared by acetalization of polyvinyl alcohol with an aldehyde. The polyvinyl acetal X is preferably an acetalization product of polyvinyl alcohol. The polyvinyl alcohol is commonly obtained by saponifying polyvinyl acetate.

The lower limit of the average degree of polymerization of the polyvinyl alcohol is preferably 200, and the upper limit thereof is preferably 5000. When the polyvinyl alcohol has an average degree of polymerization of 200 or more, a sound insulation interlayer film to be obtained can have better penetration resistance. When the polyvinyl alcohol has an average degree of polymerization of 5000 or less, formability of a sound insulation layer can be ensured. Concerning the average degree of polymerization of the polyvinyl alcohol, the lower limit is more preferably 500 and the upper limit is more preferably 4000.

The average degree of polymerization of the polyvinyl alcohol is obtained by a method in conformity with JIS K6726 "Testing methods for polyvinyl alcohol".

The lower limit of the carbon number of the aldehyde used for acetalization of the polyvinyl alcohol is preferably 4, and the upper limit thereof is preferably 6. When the aldehyde has a carbon number of 4 or more, a sound insulation interlayer film for a laminated glass to be obtained can stably contain a sufficient amount of a plasticizer. As a result, the sound insulation interlayer film can exhibit excellent sound insulation properties. Moreover, bleeding out of the plasticizer can be prevented. When the aldehyde has a carbon number of 6 or less, synthesis of the polyvinyl acetal X can be facilitated, ensuring the productivity. The C4-C6 aldehyde may be a linear or branched aldehyde, and examples thereof include n-butyraldehyde and n-valeraldehyde.

The upper limit of the hydroxy group content of the polyvinyl acetal X is preferably 30 mol %. When the hydroxy group content of the polyvinyl acetal X is 30 mol % or less, the sound insulation layer can contain a plasticizer in an amount needed for exhibiting sound insulation properties, and bleeding out of the plasticizer can be prevented. The upper limit of the hydroxy group content of the polyvinyl acetal X is more preferably 28 mol %, still more preferably 26 mol %, particularly preferably 24 mol %, and the lower limit thereof is preferably 10 mol %, more preferably 15 mol %, still more preferably 20 mol %. The hydroxy group content of the polyvinyl acetal X is a value in percentage of the mole fraction (mol %) obtained by dividing the amount of ethylene groups to which hydroxy groups are bonded by the total amount of ethylene groups of the main chain. The amount of ethylene groups to which hydroxy groups are bonded can be determined by measuring the amount of ethylene groups to which hydroxy groups are bonded in the polyvinyl acetal X by the method in conformity with JIS K6728 "Testing methods for polyvinyl butyral".

The lower limit of the acetal group content of the polyvinyl acetal X is preferably 60 mol %, and the upper limit thereof is preferably 85 mol %. When the polyvinyl acetal X has an acetal group content of 60 mol % or more, the sound insulation layer has higher hydrophobicity and can contain a plasticizer in an amount needed for exhibiting sound insulation properties. Moreover, bleeding out of the plasticizer and whitening can be prevented. When the polyvinyl acetal X has an acetal group content of 85 mol % or less, synthesis of the polyvinyl acetal X can be facilitated, ensuring the productivity. The lower limit of the acetal group content of the polyvinyl acetal X is more preferably 65 mol %, still more preferably 68 mol % or more.

The acetal group content can be obtained by measuring the amount of ethylene groups to which acetal groups are bonded in the polyvinyl acetal X by the method in conformity with JIS K6728 "Testing methods for polyvinyl butyral".

The lower limit of the acetyl group content of the polyvinyl acetal X is preferably 0.1 mol %, and the upper limit thereof is preferably 30 mol %. When the acetyl group content of the polyvinyl acetal X is 0.1 mol % or more, the sound insulation layer can contain a plasticizer in an amount needed for exhibiting sound insulation properties, and bleeding out of the plasticizer can be prevented. When the acetyl group content of the polyvinyl acetal X is 30 mol % or less, the sound insulation layer can have higher hydrophobicity, preventing whitening. The lower limit of the acetyl group content is more preferably 1 mol %, still more preferably 5 mol %, particularly preferably 8 mol %, and the upper limit thereof is more preferably 25 mol %, still more preferably 20 mol %. The acetyl group content is a value in percentage of the mole fraction (mol %) obtained by subtracting the amount of ethylene groups to which acetal groups are bonded and the amount of ethylene groups to which hydroxy groups are bonded from the total amount of ethylene groups of the main chain and then dividing the obtained value by the total amount of ethylene groups of the main chain.

The polyvinyl acetal X is preferably a polyvinyl acetal having an acetyl group content of 8 mol % or more or a polyvinyl acetal having an acetyl group content of less than 8 mol % and an acetal group content of 65 mol % or more because the sound insulation layer can readily contain a plasticizer in an amount needed for exhibiting sound insulation properties. Moreover, the polyvinyl acetal X is more preferably a polyvinyl acetal having an acetyl group content of 8 mol % or more or a polyvinyl acetal having an acetyl group content of less than 8 mol % and an acetal group content of 68 mol % or more.

The lower limit of the plasticizer content of the sound insulation layer based on 100 parts by mass of the polyvinyl acetal X is preferably 45 parts by mass, and the upper limit thereof is preferably 80 parts by mass. When the plasticizer content is 45 parts by mass or more, the sound insulation layer can exhibit high sound insulation properties. When the plasticizer content is 80 parts by mass or less, reduction in the transparency and adhesiveness of an interlayer film for a laminated glass to be obtained due to bleeding out of the plasticizer can be prevented. The lower limit of the plasticizer content is more preferably 50 parts by mass, still more preferably 55 parts by mass, and the upper limit thereof is more preferably 75 parts by mass, still more preferably 70 parts by mass. The plasticizer content of the sound insulation layer may be the plasticizer content before the production of a laminated glass or the plasticizer content after the production of a laminated glass. The plasticizer content after the production of a laminated glass can be measured by the following procedure. A produced laminated glass is allowed to stand at a temperature of 25° C. and a humidity of 30% for four weeks. Then, the laminated glass is cooled in liquid nitrogen to separate the glass plate from the interlayer film for a laminated glass. The resulting protective layers and sound insulation layer are cut in the thickness direction, and allowed to stand at a temperature of 25° C. and a humidity of 30% for 2 hours. The protective layer is peeled from the sound insulation layer using a finger or a device inserted between the protective layer and the sound insulation layer at a temperature of 25° C. and a humidity of 30%, thereby preparing 10 g of a rectangular sample for measurement of each of the protective layer and sound insulation layer. The plasticizer in the sample for measurement is extracted in diethyl ether using a Soxhlet extractor for 12 hours, and the amount of the plasticizer in the sample for measurement is determined, thereby obtaining the plasticizer contents of the protective layers and the intermediate layer.

The lower limit of the thickness of the sound insulation layer is preferably 50 μm. Having a thickness of 50 μm or more, the sound insulation layer can exhibit enough sound insulation properties. The lower limit of the thickness of the sound insulation layer is more preferably 80 μm. The upper limit thereof is not particularly limited. In consideration of the thickness as an interlayer film for a laminated glass, the upper limit is preferably 300 μm.

The protective layer prevents bleeding out of the plasticizer contained in a large amount in the sound insulation layer to prevent reduction in the adhesiveness between the interlayer film for a laminated glass and the glass plate, and imparts penetration resistance to the interlayer film for a laminated glass.

The protective layer preferably contains, for example, a plasticizer and the polyvinyl acetal Y, more preferably a plasticizer and the polyvinyl acetal Y having a larger hydroxy group content than the polyvinyl acetal X.

The polyvinyl acetal Y can be prepared by acetalization of polyvinyl alcohol with an aldehyde. The polyvinyl acetal Y is preferably an acetalization product of polyvinyl alcohol. The polyvinyl alcohol is commonly obtained by saponifying polyvinyl acetate.

The lower limit of the average degree of polymerization of the polyvinyl alcohol is preferably 200, and the upper limit thereof is preferably 5000. When the polyvinyl alcohol has an average degree of polymerization of 200 or more, an interlayer film for a laminated glass to be obtained can have better penetration resistance. When the polyvinyl alcohol has an average degree of polymerization of 5000 or less, formability of a protective layer can be ensured. Concerning the average degree of polymerization of the polyvinyl alcohol, the lower limit is more preferably 500 and the upper limit is, more preferably 4000.

The lower limit of the carbon number of the aldehyde used for acetalization of the polyvinyl alcohol is preferably 3, and the upper limit thereof is preferably 4. When the aldehyde has a carbon number of 3 or more, an interlayer film for a laminated glass to be obtained has higher penetration resistance. When the aldehyde has a carbon number of 4 or less, productivity of the polyvinyl acetal Y is improved.

The C3-C4 aldehyde may be a linear or branched aldehyde, and examples thereof include n-butyraldehyde.

The upper limit of the hydroxy group content of the polyvinyl acetal Y is preferably 33 mol %, and the lower limit thereof is preferably 28 mol %. When the polyvinyl acetal Y has a hydroxy group content of 33 mol % or less, whitening of an interlayer film for a laminated glass to be obtained can be prevented. When the polyvinyl acetal Y has a hydroxy group content of 28 mol % or more, an interlayer film for a laminated glass to be obtained has higher penetration resistance.

The lower limit of the acetal group content of the polyvinyl acetal Y is preferably 60 mol %, and the upper limit thereof is preferably 80 mol %. When the acetal group content is 60 mol % or more, a protective layer to be obtained can contain a plasticizer in an amount needed for exhibiting enough penetration resistance. When the acetal group content is 80 mol % or less, the adhesion force between the protective layer and the glass plate can be ensured. The lower limit of the acetal group content is more preferably 65 mol %, and the upper limit thereof is more preferably 69 mol %.

The upper limit of the acetyl group content of the polyvinyl acetal Y is preferably 7 mol %. When the polyvinyl acetal Y has an acetyl group content of 7 mol % or less, a protective layer to be obtained can have higher hydrophobicity, thereby preventing whitening. The upper limit of the acetyl group content is more preferably 2 mol %, and the lower limit thereof is preferably 0.1 mol %. The hydroxy group contents, acetal group contents, and acetyl group contents of polyvinyl acetals A, B, and Y can be measured by the same methods as those in the case of the polyvinyl acetal X.

The lower limit of the plasticizer content of the protective layer based on 100 parts by mass of the polyvinyl acetal Y is preferably 20 parts by mass, and the upper limit thereof is preferably 45 parts by mass. When the plasticizer content is 20 parts by mass or more, the penetration resistance can be ensured. When the plasticizer content is 45 parts by mass or less, bleeding out of the plasticizer can be prevented, thereby preventing reduction in the transparency and adhesiveness of an interlayer film for a laminated glass to be obtained. The lower limit of the plasticizer content is more preferably 30 parts by mass, still more preferably 35 parts by mass, and the upper limit thereof is more preferably 43 parts by mass, still more preferably 41 parts by mass. For better sound insulation properties of a laminated glass to be obtained, the plasticizer content of the protective layer is preferably smaller than the plasticizer content of the sound insulation layer. The plasticizer content of the protective layer may be the plasticizer content before the production of a laminated glass or the plasticizer content after the production of a laminated glass. The plasticizer content after the production of a laminated glass may be measured by the same procedure as that for the sound insulation layer.

For higher sound insulation properties of a laminated glass to be obtained, the hydroxy group content of the polyvinyl acetal Y is preferably larger than the hydroxy group content of the polyvinyl acetal X, more preferably larger by 1 mol % or more, still more preferably larger by 5 mol % or more, particularly preferably larger by 8 mol % or more. Adjustment of the hydroxy group contents of the polyvinyl acetal X and polyvinyl acetal Y enables control of the plasticizer contents of the sound insulation layer and the protective layer, so that the sound insulation layer has a lower glass transition temperature. As a result, a laminated glass to be obtained has higher sound insulation properties.

For still higher sound insulation properties of a laminated glass to be obtained, the plasticizer content (hereafter, also referred to as content X) based on 100 parts by mass of the polyvinyl acetal X of the sound insulation layer is preferably larger than the plasticizer content (hereafter, also referred to as content Y) based on 100 parts by mass of the polyvinyl acetal Y of the protective layer, more preferably larger by 5 parts by mass or more, still more preferably larger by 15 parts by mass or more, particularly preferably larger by 20 parts by mass or more. Adjustment of the content X and content Y lowers the glass transition temperature of the sound insulation layer. As a result, a laminated glass to be obtained has still higher sound insulation properties.

The protective layer may have any thickness, provided that it can fulfill the role as the protective layer. In a case where projections and recesses are formed on the protective layer, the protective layer is preferably as thick as possible to prevent the projections and recesses from being transferred to the interface with the sound insulation layer directly in contact with the protective layer. Specifically, the lower limit of the protective layer is preferably 100 μm, more preferably 300 μm, still more preferably 400 μm, particularly preferably 450 μm. The upper limit of the thickness of the protective layer is not particularly limited. In order to ensure the thickness enough to achieve sufficient sound insulation properties, the upper limit of the protective layer is practically about 500 μm.

The sound insulation interlayer film may be produced by any method. The sound insulation interlayer film can be produced, for example, by a method of forming the sound insulation layer and protective layer as sheet materials by a conventional film formation method such as extrusion, calendering, or pressing and then stacking the obtained sheet materials.

The present invention also encompasses a laminated glass including the interlayer film for a laminated glass of the present invention interposed between a pair of glass plates.

The glass plate may be a commonly used transparent glass plate. Examples thereof include inorganic glass plates such as float glass plates, polished glass plates, figured glass plates, meshed glass plates, wired glass plates, colored glass plates, heat-absorbing glass plates, heat-reflecting glass plates, and green glass plates. An ultraviolet shielding glass plate including an ultraviolet shielding coat layer on a glass surface may also be used. Other examples of the glass plates include organic plastic plates made of polyethylene terephthalate, polycarbonate, polyacrylate, or the like.

The glass plates may include two or more types of glass plates. For example, the laminated glass may be a laminated glass including the interlayer film for a laminated glass of the present invention between a transparent float glass plate and a colored glass plate such as a green glass plate. The glass plates may include two or more glass plates with different thicknesses.

Advantageous Effects of Invention

The present invention can provide an interlayer film for a laminated glass which can be stored in a stacked state without experiencing autohesion so as to be easily peelable, and a laminated glass including the interlayer film for a laminated glass.

DESCRIPTION OF EMBODIMENTS

Figure 1:
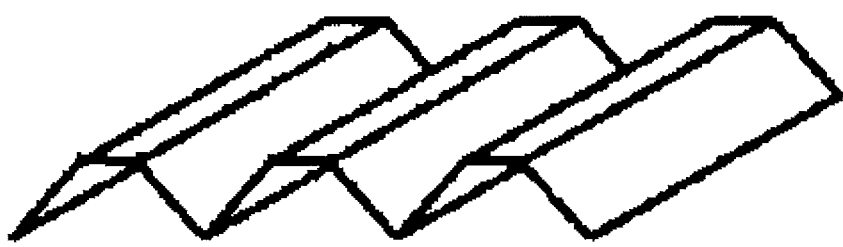
FIG. 1 is a view schematically illustrating an exemplary interlayer film for a laminated glass in which recesses each having a groove shape with a continuous bottom are regularly adjacent and parallel to each other at equal intervals on a surface.
Figure 2:
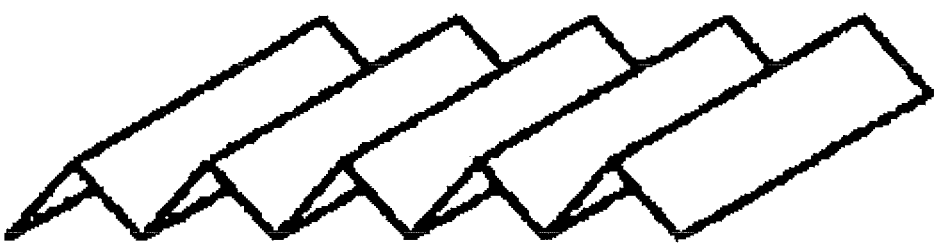
FIG. 2 is a view schematically illustrating an exemplary interlayer film for a laminated glass in which recesses each having a groove shape with a continuous bottom are regularly adjacent and parallel to each other at equal intervals on a surface.
Figure 3:
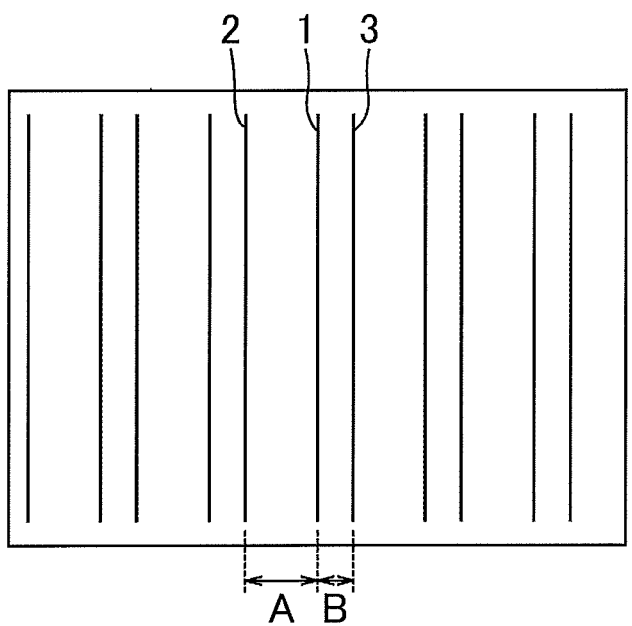
FIG. 3 is a view schematically illustrating an exemplary interlayer film for a laminated glass in which recesses each having a groove shape with a continuous bottom are regularly adjacent and parallel to each other not at equal intervals.
Figure 4:
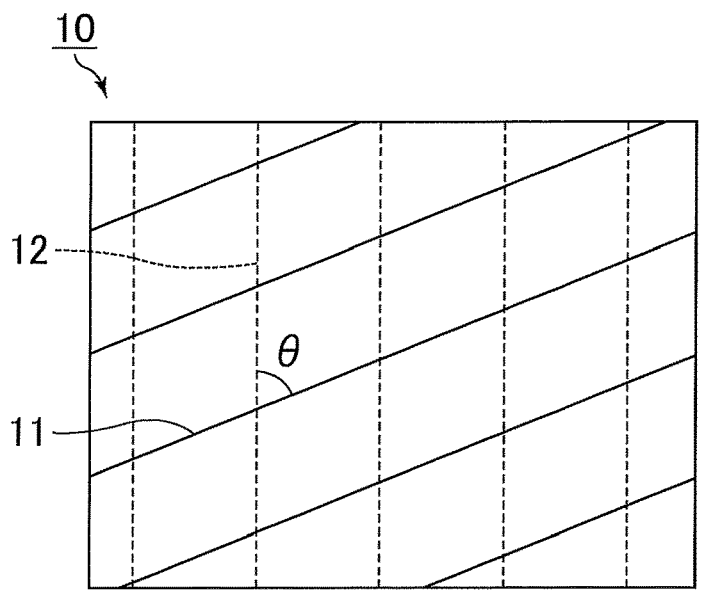
FIG. 4 is a view schematically explaining an intersection angle θ.
Figure 5:
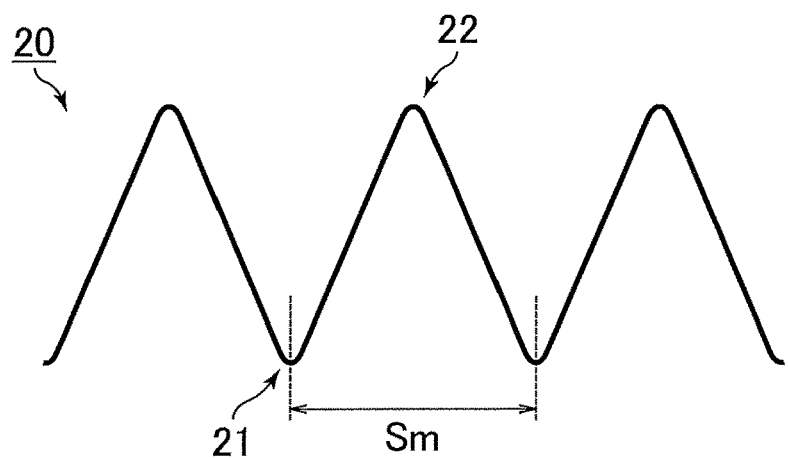
FIG. 5 is a view schematically explaining an interval Sm of recesses and a radius of rotation R of projections.
Figure 5:
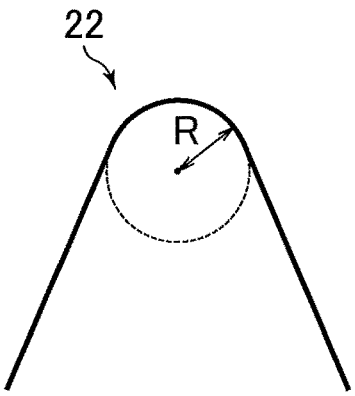

Embodiments of the present invention are more specifically described in the following with reference to, but not limited to, examples.

Example 1

(1) Preparation of a Resin Composition

Polyvinyl alcohol having an average degree of polymerization of 1700 was acetalized with n-butyraldehyde to give polyvinyl butyral (acetyl group content: 0.9 mol %, butyral group content: 69 mol %, hydroxy group content: 30 mol %). To 100 parts by mass of the polyvinyl butyral was added 40 parts by mass of triethylene glycol-di-2-ethylhexanoate (3GO) as a plasticizer, and kneaded well with a mixing roll to give a resin composition.

(2) Production of an Interlayer Film for a Laminated Glass

The obtained resin composition was extruded using an extruder to provide an interlayer film for a laminated glass having a thickness of 760 μm.

(3) Formation of Projections and Recesses

In the first step, a random pattern of projections and recesses was transferred to both surfaces of the interlayer film for a laminated glass by the following procedure. A pair of rolls in the same shape having a coarse main emboss pattern and a fine sub-emboss pattern was prepared by forming random projections and recesses on the surfaces of iron rolls with an abrasive material, performing vertical grinding thereon, and further forming finer projections and recesses on planar portions after the grinding with a finer abrasive material.

Using the pair of rolls as a device for transferring a pattern of projections and recesses, a random pattern of projections and recesses was transferred to both surfaces of the obtained interlayer film for a laminated glass. The transferring conditions employed here were a temperature of the interlayer film for a laminated glass of 80° C., a temperature of the rolls of 145° C., a linear velocity of 10 m/min, and a linear pressure of 0 to 200 kN/m.

In the second step, projections and recesses in a pattern of grooves each with a continuous bottom were formed by the following procedure. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass having a random pattern of projections and recesses transferred in the first step was passed through the device for transferring a pattern of projections and recesses, thereby forming projections and recesses in which recesses each having a groove shape with a continuous bottom were regularly adjacent and parallel to each other at equal intervals on a first surface. The transferring conditions employed here were a temperature of the interlayer film for a laminated glass of 80° C., a temperature of the rolls of 140° C., a linear velocity of 10 m/min, and a linear pressure of 5 to 100 kN/m.

Then, the same operations were performed on a second surface of the interlayer film for a laminated glass to form recesses each having a groove shape with a continuous bottom. At that time, the intersection angle between the recesses each having a groove shape with a continuous bottom on the first surface and the recesses each having a groove shape with a continuous bottom on the second surface was set to 20°.

(4) Analysis of Projections and Recesses on First Surface and Second Surface

The first surface and the second surface of the obtained interlayer film for a laminated glass were observed (observation range: 20 mm×20 mm) using an optical microscope (BS-8000III produced by SONIC) to measure the interval between the adjacent recesses. The average of the shortest distance between the deepest bottoms of the adjacent recesses was calculated, and the interval Sm1 between the recesses on the first surface and the interval Sm2 between the recesses on the second surface were each 390 μm.

The interlayer film for a laminated glass was cut with a single-edged razor (FAS-10 produced by FEATHER Safety Razor Co., Ltd.) in a direction perpendicular to the direction of the engraved lines of the recesses and parallel to the thickness direction of the film in such a manner that the cut plane was not deformed. Specifically, the razor was not slid in the direction perpendicular to the recesses but pressed in the direction parallel to the thickness direction. The cross section was observed using a microscope ("DSX-100" produced by Olympus Corporation). The cross section was photographed at a magnification of 277 times. The obtained image was enlarged to 50 μm/20 mm for analysis using measurement software included in accessory software. The radius of an inscribed circle at the apex of the projection was determined as the radius of rotation of the tip portion of the projection. According to this method, the radius of rotation R1 of the projections on the first surface and the radius of rotation R2 of the projections on the second surface were measured, and were each 37 μm. The measurement was performed at 23° C. and 30 RH %.

The roughness Rz of the first surface and the second surface was measured perpendicularly so as to transverse the direction in which the recess in an engraved line direction is continuous in conformity with JIS B-0601 (2001). The measurement device may be, for example, "Surfcorder SE300" available from Kosaka Laboratory Ltd. The measurement was performed at a cut-off value of 2.5 mm, a standard length of 2.5 mm, a measurement length of 12.5 mm, a spare length of 2.5 mm, and a stylus feed rate of 0.5 mm/sec. The stylus used had a tip radius of 2 μm and a tip angle of 60°. The measurement was performed at 23° C. and 30 RH %. The interlayer film was allowed to stand in an environment of the measurement conditions for three hours or longer before the measurement.

(5) Measurement of Roughness Rz of Tip Portions of Projections

The roughness Rz1 of the tip portions of the projections on the first surface and the roughness Rz2 of the tip portions of the projections on the second surface were measured as a ten-point average roughness defined in JIS B 0601 (1994) by the following procedure using a three-dimensional profilometer (e.g., "KS-1100" produced by KEYENCE CORPO- RATION, head: model "LT-9510VM") and "KS-measure", measurement software included therewith.

The roughness of the surface of the interlayer film for a laminated glass was measured in a visual field of 2 cm×2 cm, and the roughness of a length of 2.5 mm along the direction parallel to the direction in which the apex portions of the projections are continuous was measured at 10 sites on the apex portions of the projections in the obtained data. The average of 10 obtained values was taken as the roughness of the tip portions of the projections. When 10 sites of the roughness of a length of 2.5 mm were determined, the lines of the 2.5-mm length were set to be apart from each other by 50 μm or more. The roughness of a length of 2.5 mm herein refers to "Rz" resulting from the roughness profile data that is obtained as follows. "KS-Analyzer Ver. 2.00", analysis software included with the profilometer, was used in the line roughness measurement mode with a length condition set at "2500 μm". The area of interest was selected in the obtained three-dimensional image data, and the roughness profile data of the area was obtained. The roughness profile data was obtained at a cut-off value of 2.5 mm. Height smoothing and tilt correction were not performed. The measurement conditions other than the visual field were as follows: stage feed condition: continuous; scan direction: bi-directional scanning; leading axis: X-axis; stage travel rate: 250.0 μm/s; and axis feed rate: 10000.0 μm/s. The measuring pitch of the X-axis was set at 2.0 μm, and that of the Y-axis was set at 2.0 μm.

In a case where the highest point of the projection was positioned at the center point of the shortest straight line connecting the deepest bottoms of two adjacent recesses present in the visual field of 2 cm×2 cm, the "apex portion" of the projection in the measurement of the roughness of the tip portions was determined to refer to a range corresponding to 10% of the length of the shortest straight line, centered on the center point of the shortest straight line connecting the deepest bottoms of two adjacent recesses. In a case where the highest point of the projection was not positioned at the center point of the shortest straight line connecting the deepest bottoms, the "apex portion" of the projection was determined to refer to a range corresponding to 10% of the length of the shortest straight line, centered on the point at which the projection was highest on the shortest straight line connecting the deepest bottoms of two adjacent recesses. The measurement was performed at 23° C. and 30 RH %.

Examples 2 to 25, Comparative Examples 1 TO 10

The interlayer film for a laminated glass was produced as in Example 1, except that the acetyl group content, butyral group content, and hydroxy group content of the polyvinyl butyral, and the plasticizer content were changed as shown in Tables 1, 2, and 3, and that the intervals Sm1 and Sm2 between the recesses on the first surface and the second surface, respectively, and the radii of rotation R1 and R2 of the projections on the first surface and the second surface, respectively, the roughness Rz1 and Rz2 of the tip portions of the projections on the first surface and the second surface, respectively, and the surface roughness Rz were changed as shown in Tables 1, 2, and 3.

Example 26

(Preparation of a Resin Composition for Protective Layers)
Polyvinyl alcohol having an average degree of polymerization of 1700 was acetalized with n-butyraldehyde to give polyvinyl butyral (acetyl group content: 1 mol %, butyral group content: 69 mol %, hydroxy group content: 30 mol %). To 100 parts by mass of the polyvinyl butyral were added 36 parts by mass of triethylene glycol-di-2-ethylhexanoate (3GO) as a plasticizer, and kneaded well with a mixing roll to give a resin composition for protective layers.
(Preparation of a Resin Composition for Sound Insulation Layers)

Polyvinyl alcohol having an average degree of polymerization of 2300 was acetalized with n-butyraldehyde to give polyvinyl butyral (acetyl group content: 12.5 mol %, butyral group content: 64 mol %, hydroxy group content: 23.5 mol %). To 100 parts by mass of the polyvinyl butyral was added 76.5 parts by mass of triethylene glycol-di-2-ethylhexanoate (3GO) as a plasticizer, and kneaded well with a mixing roll to give a resin composition for sound insulation layers.
(Production of an Interlayer Film for a Laminated Glass)

The resin composition for sound insulation layers and the resin composition for protective layers were co-extruded to form an interlayer film for a laminated glass (width: 100 cm) having a triple layer structure including a protective layer (thickness: 350 μm), a sound insulation layer (thickness: 100 μm), and a protective layer (thickness: 350 μm) stacked in the stated order in the thickness direction.
(Formation of Projections and Recesses)

In the first step, a random pattern of projections and recesses was transferred to both surfaces of the resulting interlayer film for a laminated glass by the following procedure. A pair of rolls in the same shape having a coarse main emboss pattern and a fine sub-emboss pattern was obtained by forming random projections and recesses on the surfaces of iron rolls with an abrasive material, performing vertical grinding thereon, and further forming finer projections and recesses on planar portions after the grinding.

The pair of rolls was used as a device for transferring a pattern of projections and recesses, and a random pattern of projections and recesses was transferred to both surfaces of the obtained interlayer film for a laminated glass. The transferring conditions employed here were a temperature of the interlayer film for a laminated glass of 80° C., a temperature of the rolls of 145° C., a linear velocity of 10 m/min, and a linear pressure of 0 to 200 kN/m.

In the second step, projections and recesses in a pattern of grooves each with a continuous bottom were formed by the following procedure. A pair of rolls including a metal roll having a surface milled with a triangular oblique line-type mill and a rubber roll having a JIS hardness of 45 to 75 was used as a device for transferring a pattern of projections and recesses. The interlayer film for a laminated glass on which the random pattern of projections and recesses was formed in the first step was passed through the device for transferring a pattern of projections and recesses, thereby forming projections and recesses in which the recesses each having a groove shape with a continuous bottom were formed parallel to each other at equal intervals on a first surface of the interlayer film for a laminated glass. The transferring conditions employed here were a temperature of the interlayer film for a laminated glass of 80° C., a temperature of the rolls of 140° C., a linear velocity of 10 m/min, and a linear pressure of 5 to 100 kN/m.

Next, the recesses each having a groove shape with a continuous bottom were also formed on a second surface of the interlayer film for a laminated glass by the same operation. At that time, the intersection angle between the recesses each having a groove shape with a continuous bottom (shape of an engraved line) on the first surface and the recesses each having a groove shape with a continuous bottom (shape of an engraved line) on the second surface was set to 20°.

The intervals Sm1 and Sm2 of the recesses on the first surface and the second surface, respectively, the radii of rotation R1 and R2 of the projections on the first surface and the second surface, respectively, the roughnesses Rz1 and Rz2 of the tip portions of the projections on the first surface and the second surface, respectively, and the surface roughness Rz were measured as in Example 1.

(Measurement of Plasticizer Content)

A laminated glass after the production was allowed to stand at a temperature of 25° C. and a humidity of 30% for 4 weeks. Then, the laminated glass was cooled in liquid nitrogen to separate the glass plate from the interlayer film for a laminated glass. The resulting protective layers and sound insulation layer were cut in the thickness direction, and allowed to stand at a temperature of 25° C. and a humidity of 30% for 2 hours. The protective layer was peeled from the sound insulation layer using a finger or a device inserted between the protective layer and the sound insulation layer at a temperature of 25° C. and a humidity of 30%, thereby preparing 10 g of a rectangular sample for measurement of each of the protective layer and sound insulation layer. The plasticizer in the sample for measurement was extracted in diethyl ether using a Soxhlet extractor for 12 hours, and the amount of the plasticizer in the sample for measurement was determined, thereby obtaining the plasticizer contents of the protective layer and the intermediate layer.

Examples 27 TO 34, Comparative Examples 11 AND 12

An interlayer film for a laminated glass was produced as in Example 26, except that the acetyl group content, butyral group content, and hydroxy group content of the polyvinyl butyral used were changed as shown in Table 4, and that the intervals Sm1 and Sm2 of the recesses on the first surface and the second surface, respectively, the radii of rotation R1 and R2 of the projections on the first surface and the second surface, respectively, and the roughnesses Rz1 and Rz2 of the tip portions of the projections on the first surface and the second surface, respectively, and the surface roughness Rz were changed as shown in Table 4.

(Evaluation)

The autohesion force of each of the interlayer films for a laminated glass obtained in the examples and the comparative examples was evaluated. Tables 1, 2, 3, and 4 show the results.

The interlayer films for a laminated glass obtained in the examples and the comparative examples were each cut to a size of 150 mm in length and 150 mm in width as a test sample. Two sheets of the obtained test samples were stacked, and a glass plate (weight: 5.8 kg) was placed thereon with release paper interposed therebetween as a release treatment. The release paper was prepared by coating paper, as a base, with silicone. The resulting stack was left as it was in a constant temperature and humidity chamber at a temperature of 30° C. and a humidity of 30% for 48 hours. Then, end portions (2 cm) of the two test samples were peeled and each were fixed using a gripper (width: 15 cm). The 180° peeling strength between the two test samples was measured at a peel rate of 50 cm/min, a temperature of 23° C., and a humidity of 30%. The average (N/15 cm) of the peeling strength within a peeling distance range of 50 mm to 200 mm was calculated. The conditions other than the above conditions were set in conformity with JIS K-6854-3 (1994). The obtained value was taken as the autohesion force of the interlayer film for a laminated glass.

For enabling peeling of the interlayer film for a laminated glass by humans or a device for carrying the film, the autohesion force is preferably 25 N/15 cm or less, more preferably 20 N/15 cm or less, still more preferably 13 N/15 cm or less, particularly preferably 8 N/15 cm or less.

TABLE 1

| | | Example 1 | Example 2 | Example 3 | Example 4 | Example 5 | Example 6 | Example 7 | Example 8 | Example 9 | Example 10 | Example 11 | Example 12 | Example 13 |
|---|---|---|---|---|---|---|---|---|---|---|---|---|---|---|
| Composition | Bu degree (mol %) | 69 | 69 | 69 | 69 | 69 | 69 | 69 | 69 | 69 | 69 | 69 | 69 | 69 |
| | OH degree (mol %) | 30 | 30 | 30 | 30 | 30 | 30 | 30 | 30 | 30 | 30 | 30 | 30 | 30 |
| | Ac degree (mol %) | 0.9 | 0.9 | 0.9 | 0.9 | 0.9 | 0.9 | 0.9 | 0.9 | 0.9 | 0.9 | 0.9 | 0.9 | 0.9 |
| | Parts of plasticizer (phr) | 40 | 40 | 40 | 40 | 40 | 40 | 40 | 40 | 40 | 40 | 40 | 40 | 40 |
| Projections and recesses on first surface | Sm1 (μm) | 390 | 190 | 190 | 195 | 290 | 290 | 395 | 270 | 195 | 198 | 185 | 290 | 290 |
| | R1 (μm) | 37 | 22 | 55 | 30 | 32 | 31 | 36 | 32 | 55 | 28 | 28 | 30 | 30 |
| | Roughness Rz1 of tip portion of projection (μm) | 1.8 | 1 | 1.1 | 1.2 | 2 | 16 | 14 | 2 | 1 | 1.5 | 1.3 | 1.4 | 1.2 |
| | R1/Sm1 | 0.09 | 0.12 | 0.29 | 0.15 | 0.11 | 0.11 | 0.09 | 0.12 | 0.28 | 0.14 | 0.15 | 0.10 | 0.10 |
| | Roughness Rz of first surface (μm) | 45 | 40 | 48 | 45 | 46 | 55 | 44 | 38 | 48 | 39 | 34 | 38 | 37 |
| Projections and recesses on second surface | Sm2 (μm) | 390 | 190 | 195 | 195 | 290 | 285 | 385 | 270 | 195 | 198 | 185 | 285 | 294 |
| | R2 (μm) | 37 | 21 | 50 | 30 | 32 | 35 | 40 | 32 | 52 | 26 | 24 | 29 | 27 |
| | Roughness Rz2 of tip portion of projection (μm) | 1.8 | 1 | 1.3 | 1.2 | 2 | 15 | 15 | 2 | 1.5 | 1.5 | 1.3 | 1.5 | 1.1 |
| | R2/Sm2 | 0.09 | 0.11 | 0.26 | 0.15 | 0.11 | 0.12 | 0.10 | 0.12 | 0.27 | 0.13 | 0.13 | 0.10 | 0.09 |
| | Roughness Rz of second surface (μm) | 46 | 43 | 48 | 48 | 46 | 56 | 43 | 39 | 48 | 37 | 36 | 42 | 38 |

TABLE 1-continued

|  | Example 1 | Example 2 | Example 3 | Example 4 | Example 5 | Example 6 | Example 7 | Example 8 | Example 9 | Example 10 | Example 11 | Example 12 | Example 13 |
| --- | --- | --- | --- | --- | --- | --- | --- | --- | --- | --- | --- | --- | --- |
| Intersection angle θ | 20 | 10 | 20 | 90 | 20 | 20 | 20 | 10 | 75 | 30 | 20 | 30 | 60 |
| R/Sm | 0.09 | 0.11 | 0.27 | 0.15 | 0.11 | 0.11 | 0.10 | 0.12 | 0.27 | 0.14 | 0.14 | 0.10 | 0.10 |
| $(1000/Sm)^2 \times \sin\theta$ | 2.25 | 4.81 | 9.23 | 26.30 | 4.07 | 4.14 | 2.25 | 2.38 | 25.40 | 12.75 | 9.99 | 6.05 | 10.16 |
| Autohesion force (N/15 cm) | 19.8 | 15.1 | 18.0 | 3.2 | 15.4 | 7.2 | 11.5 | 23.0 | 5.8 | 11.3 | 13.8 | 13.9 | 8.2 |

TABLE 2

|  |  | Example 14 | Example 15 | Example 16 | Example 17 | Example 18 | Example 19 | Example 20 | Example 21 | Example 22 | Example 23 | Example 24 | Example 25 |
| --- | --- | --- | --- | --- | --- | --- | --- | --- | --- | --- | --- | --- | --- |
| Composition | Bu degree (mol %) | 69 | 69 | 69 | 69 | 69 | 69 | 69 | 69 | 69 | 69 | 70 | 68 |
|  | OH degree (mol %) | 30 | 30 | 30 | 30 | 30 | 30 | 30 | 30 | 30 | 30 | 29 | 31 |
|  | Ac degree (mol %) | 0.9 | 0.9 | 0.9 | 0.9 | 0.9 | 0.9 | 0.9 | 0.9 | 0.9 | 0.9 | 1.1 | 0.8 |
|  | Parts of plasticizer (phr) | 40 | 40 | 40 | 40 | 40 | 40 | 40 | 40 | 40 | 40 | 41 | 39 |
| Projections and recesses on first surface | Sm1 (μm) | 220 | 218 | 398 | 210 | 200 | 198 | 280 | 310 | 310 | 198 | 195 | 190 |
|  | R1 (μm) | 20 | 18 | 38 | 55 | 55 | 55 | 32 | 30 | 33 | 18 | 56 | 53 |
|  | Roughness Rz1 of tip portion of projection (μm) | 1.1 | 1.5 | 2 | 1.5 | 10 | 13 | 21 | 23 | 23 | 19 | 1.3 | 1 |
|  | R1/Sm1 | 0.09 | 0.08 | 0.10 | 0.26 | 0.28 | 0.28 | 0.11 | 0.10 | 0.11 | 0.09 | 0.29 | 0.28 |
|  | Roughness Rz of first surface (μm) | 39 | 48 | 56 | 38 | 45 | 45 | 38 | 37 | 44 | 50 | 45 | 54 |
| Projections and recesses on second surface | Sm2 (μm) | 202 | 203 | 385 | 198 | 198 | 185 | 270 | 285 | 285 | 203 | 195 | 195 |
|  | R2 (μm) | 20 | 18 | 38 | 54 | 58 | 52 | 33 | 27 | 33 | 18 | 48 | 53 |
|  | Roughness Rz2 of tip portion of projection (μm) | 1.1 | 1.2 | 1.6 | 1.5 | 8 | 13.5 | 20.5 | 28 | 28 | 18 | 1.5 | 1.5 |
|  | R2/Sm2 | 0.10 | 0.09 | 0.10 | 0.27 | 0.29 | 0.28 | 0.12 | 0.09 | 0.12 | 0.09 | 0.25 | 0.27 |
|  | Roughness Rz of second surface (μm) | 36 | 52 | 52 | 38 | 45 | 48 | 39 | 38 | 43 | 52 | 52 | 50 |
| Intersection angle θ |  | 90 | 90 | 20 | 90 | 90 | 20 | 10 | 60 | 75 | 90 | 20 | 20 |
| R/Sm |  | 0.09 | 0.09 | 0.10 | 0.27 | 0.28 | 0.28 | 0.12 | 0.10 | 0.11 | 0.09 | 0.27 | 0.28 |
| $(1000/Sm)^2 \times \sin\theta$ |  | 22.46 | 22.57 | 2.23 | 24.03 | 25.25 | 9.33 | 2.30 | 9.78 | 10.91 | 24.88 | 8.99 | 9.23 |
| Autohesion force (N/15 cm) |  | 5.1 | 4.2 | 22.1 | 12.8 | 10.1 | 7.5 | 6.8 | 6.5 | 5.8 | 3.8 | 20.0 | 16.2 |

TABLE 3

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
| --- | --- | --- | --- | --- | --- | --- | --- | --- | --- | --- | --- |
| Composition | Bu degree (mol %) | 69.1 | 69.1 | 69.1 | 69.1 | 69.1 | 69.1 | 69.1 | 69.1 | 69.1 | 69.1 |
|  | OH degree (mol %) | 30 | 30 | 30 | 30 | 30 | 30 | 30 | 30 | 30 | 30 |
|  | Ac degree (mol %) | 0.9 | 0.9 | 0.9 | 0.9 | 0.9 | 0.9 | 0.9 | 0.9 | 0.9 | 0.9 |
|  | Parts of plasticizer (phr) | 40 | 40 | 40 | 40 | 40 | 40 | 40 | 40 | 40 | 40 |
| Projections and recesses on first surface | Sm1 (μm) | 200 | 390 | 290 | 400 | 300 | 295 | 230 | 230 | 400 | 301 |
|  | R1 (μm) | 114 | 40 | 90 | 40 | 30 | 73 | 73 | 80 | 180 | 180 |
|  | Roughness Rz1 of tip portion of projection (μm) | 1.1 | 1.5 | 0.5 | 2 | 1.5 | 1.8 | 1.5 | 1.5 | 13 | 13 |
|  | R1/Sm1 | 0.57 | 0.10 | 0.31 | 0.10 | 0.10 | 0.25 | 0.32 | 0.35 | 0.45 | 0.60 |
|  | Roughness Rz of first surface (μm) | 30 | 42 | 38 | 45 | 37 | 33 | 37 | 35 | 45 | 45 |
| Projections and | Sm2 (μm) | 200 | 390 | 295 | 395 | 398 | 284 | 218 | 218 | 395 | 298 |
|  | R2 (μm) | 110 | 40 | 93 | 38 | 36 | 78 | 73 | 75 | 147 | 147 |

TABLE 3-continued

|  |  | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| recesses on second surface | Roughness Rz2 of tip portion of projection (μm) | 1.1 | 1.5 | 0.4 | 1.8 | 1.5 | 1.5 | 1.4 | 1.4 | 22 | 22 |
|  | R2/Sm2 | 0.55 | 0.10 | 0.32 | 0.10 | 0.09 | 0.27 | 0.33 | 0.34 | 0.37 | 0.49 |
|  | Roughness Rz of second surface (μm) | 32 | 44 | 36 | 39 | 34 | 33 | 38 | 37 | 39 | 39 |
| Intersection angle θ |  | 20 | 8 | 10 | 5 | 5 | 5 | 10 | 20 | 20 | 45 |
| R/Sm |  | 0.56 | 0.10 | 0.31 | 0.10 | 0.10 | 0.26 | 0.33 | 0.35 | 0.41 | 0.55 |
| $(1000/Sm)^2 \times \sin\theta$ |  | 8.55 | 0.91 | 2.03 | 0.55 | 0.72 | 1.04 | 3.46 | 6.82 | 2.16 | 7.88 |
| Autohesion force (N/15 cm) |  | 49.1 | 60.0 | 48.0 | 78.0 | 44.1 | 65.0 | 37.5 | 28.3 | 33.7 | 30.0 |

TABLE 4

|  |  | Example 26 | Example 27 | Example 28 | Example 29 | Example 30 | Example 31 | Example 32 | Example 33 | Example 34 | Comparative Example 11 | Comparative Example 12 |
|---|---|---|---|---|---|---|---|---|---|---|---|---|
| First resin layer | Bu degree (mol %) | 69 | 69 | 69 | 69 | 68.5 | 69.9 | 69 | 69 | 69 | 69 | 69 |
|  | OH degree (mol %) | 30 | 30 | 30 | 30 | 31 | 29 | 30 | 30 | 30 | 30 | 30 |
|  | Ac degree (mol %) | 1 | 1 | 1 | 1 | 0.5 | 1.1 | 1 | 1 | 1 | 1 | 1 |
|  | Parts of plasticizer (phr) | 36 | 36 | 36 | 36 | 36 | 39 | 36 | 36 | 36 | 36 | 36 |
| Second resin layer | Bu degree (mol %) | 64 | 64 | 64 | 64 | 67 | 77.8 | 64 | 64 | 64 | 64 | 64 |
|  | OH degree (mol %) | 23.5 | 23.5 | 23.5 | 23.5 | 25 | 20.7 | 23.5 | 23.5 | 23.5 | 23.5 | 23.5 |
|  | Ac degree (mol %) | 12.5 | 12.5 | 12.5 | 12.5 | 8 | 1.5 | 12.5 | 12.5 | 12.5 | 12.5 | 12.5 |
|  | Parts of plasticizer (phr) | 76.5 | 76.5 | 76.5 | 76.5 | 75 | 79.3 | 76.5 | 76.5 | 76.5 | 76.5 | 76.5 |
| Projections and recesses on first surface | Sm1 (μm) | 390 | 195 | 197 | 195 | 295 | 285 | 292 | 294 | 392 | 202 | 392 |
|  | R1 (μm) | 35 | 55 | 53 | 32 | 33 | 33 | 32 | 33 | 37 | 106 | 41 |
|  | Roughness Rz1 of tip portion of projection (μm) | 1.2 | 2.2 | 2.1 | 1.9 | 2 | 15.2 | 2.3 | 15 | 15.8 | 1.6 | 2 |
|  | R1/Sm1 | 0.09 | 0.29 | 0.28 | 0.15 | 0.11 | 0.12 | 0.11 | 0.11 | 0.09 | 0.52 | 0.10 |
|  | Roughness Rz of first surface (μm) | 45 | 48 | 51 | 45 | 46 | 55 | 45 | 55 | 44 | 30 | 44 |
| Projections and recesses on second surface | Sm2 (μm) | 392 | 195 | 189 | 193 | 285 | 275 | 286 | 291 | 382 | 198 | 382 |
|  | R2 (μm) | 35 | 52 | 50 | 33 | 31 | 33 | 33 | 33 | 36 | 104 | 40 |
|  | Roughness Rz2 of tip portion of projection (μm) | 1.6 | 2.5 | 2.4 | 2.2 | 2.5 | 15.4 | 2.9 | 16.2 | 15.3 | 1.1 | 2.3 |
|  | R2/Sm2 | 0.09 | 0.26 | 0.27 | 0.15 | 0.11 | 0.12 | 0.12 | 0.11 | 0.09 | 0.53 | 0.10 |
|  | Roughness Rz of second surface (μm) | 46 | 46 | 51 | 46 | 46 | 56 | 46 | 52 | 43 | 35 | 42 |
| Intersection angle θ |  | 20 | 20 | 75 | 90 | 20 | 20 | 20 | 20 | 20 | 20 | 8 |
| R/Sm |  | 0.09 | 0.27 | 0.27 | 0.15 | 0.11 | 0.12 | 0.11 | 0.11 | 0.09 | 0.53 | 0.10 |
| $(1000/Sm)^2 \times \sin\theta$ |  | 2.24 | 8.99 | 25.93 | 26.57 | 4.07 | 4.36 | 4.09 | 4.00 | 2.28 | 8.55 | 0.93 |
| Autohesion force (N/15 cm) |  | 19.0 | 17.0 | 5.6 | 4.5 | 14.3 | 7.0 | 13.4 | 6.3 | 10.9 | 45.0 | 56.0 |

INDUSTRIAL APPLICABILITY

The present invention can provide an interlayer film for a laminated glass which can be stored in a stacked state without experiencing autohesion so as to be easily peelable, and a laminated glass including the interlayer film for a laminated glass.

REFERENCE SIGNS LIST

1: One arbitrarily selected recess
2: Recess adjacent to the arbitrarily selected recess
3: Recess adjacent to the arbitrarily selected recess
A: Interval between recess 1 and recess 2
B: Interval between recess 1 and recess 3
10: Interlayer film for a laminated glass
11: Recess having a groove shape with a continuous bottom on the first surface
12: Recess having a groove shape with a continuous bottom on the second surface
20: Projections and recesses on the first surface or second surface
21: Recess having a groove shape with a continuous bottom
22: Projection

The invention claimed is:
1. An interlayer film for a laminated glass, having recesses and projections on a first surface and a second surface opposite to the first surface,
the recesses on the first surface each having a groove shape with a continuous bottom and being regularly adjacent and parallel to each other, the recesses on the second surface each having a groove shape with a continuous bottom and being regularly adjacent and parallel to each other, the interlayer film for a laminated glass satisfying Formulae (1), (2), (3), (5) and (6):

$$\theta \geq 10°  \quad (1),$$

$$0.09 \leq R/Sm \leq 0.3 \quad (2),$$

$$Rz \geq 1 \quad (3),$$

$$0.08 \leq R1/Sm1 \leq 0.3 \quad (5), \text{ and}$$

$$0.09 \leq R2/Sm2 \leq 0.3 \quad (6),$$

the $\theta$ representing an intersection angle of the recesses each having a groove shape with a continuous bottom on the first surface and the recesses each having a groove shape with a continuous bottom on the second surface, the Sm representing the average of Sm1 (μm) and Sm2 (μm), the Sm1 representing an interval between the recesses each having a groove shape with a continuous bottom on the first surface, the Sm2 representing an interval between the recesses each having a groove shape with a continuous bottom on the second surface, the R representing the average of R1 (μm) and R2 (μm), the R1 representing the radius of rotation of the projections on the first surface, the R2 representing the radius of rotation of the projections on the second surface, wherein the R1 is 18 to 100 μm, and the R2 is 18 to 100 μm, the Rz representing the average of Rz1 (μm) representing a roughness of tip portions of the projections on the first surface and Rz2 (μm) representing a roughness of tip portions of the projections on the second surface, wherein the roughness of the tip portions of the projections is defined in accordance with the ten-point roughness of JIS B 0601 (1994), and wherein the roughness of the tip portions of the projections is measured over a length of 2.5 mm along a direction parallel to a direction in which apex portions of the projections are continuous, measurements are obtained at 10 sites on the apex portions of the projections to obtain 10 values, and an average of the 10 obtained values is the roughness of the tip portions of the projections.

2. The interlayer film for a laminated glass according to claim 1, wherein the intersection angle $\theta$ and the Sm representing the average of the Sm1 and Sm2 satisfy Formula (4):

$$(1000/Sm)^2 \times \sin\theta \geq 2.2 \quad (4).$$

3. The interlayer film for a laminated glass according to claim 1, wherein the intersection angle $\theta$ is less than 90°.

4. The interlayer film for a laminated glass according to claim 1, wherein the Sm representing the average of the Sm1 and Sm2 is 200 μm or less.

5. A laminated glass comprising:
a pair of glass plates; and
the interlayer film for a laminated glass according to claim 1 interposed between the pair of glass plates.

6. The interlayer film for a laminated glass according to claim 1, wherein the projections have a planar apex.

7. The interlayer film for a laminated glass according to claim 1, wherein the recesses each having a groove shape with a continuous bottom are regularly adjacent and parallel to each other not at equal intervals.

8. The interlayer film for a laminated glass according to claim 1, wherein the intersection angle $\theta$ is 45° or more.

9. The interlayer film for a laminated glass according to claim 1, wherein the intersection angle $\theta$ is 45° or more and less than 90°.

10. The interlayer film for a laminated glass according to claim 1, wherein the recesses and projections on the first surface and the second surface opposite to the first surface are not provided in a grid.

11. The interlayer film for a laminated glass according to claim 1, wherein a roughness of the first surface and/or the second surface is 10 to 60 μm.

* * * * *